(12) United States Patent
Baig

(10) Patent No.: US 10,499,107 B1
(45) Date of Patent: Dec. 3, 2019

(54) TELEVISION SYSTEM AND METHOD FOR CONTROLLING THE TELEVISION SYSTEM

(71) Applicant: TP Vision Holding B.V., Amsterdam (NL)

(72) Inventor: Azmathulla Baig, Karnataka (IN)

(73) Assignee: TP VISION HOLDING B.V., Amsterdam (NL)

( * ) Notice: Subject to any disclaimer, the term of this patent is extended or adjusted under 35 U.S.C. 154(b) by 0 days.

(21) Appl. No.: 16/215,281

(22) Filed: Dec. 10, 2018

(30) Foreign Application Priority Data

Nov. 27, 2018 (EP) .................... 18208487

(51) Int. Cl.
| | |
|---|---|
| *H04N 21/4415* | (2011.01) |
| *H04N 5/44* | (2011.01) |
| *G06K 9/00* | (2006.01) |
| *H04N 21/45* | (2011.01) |
| *H04N 21/443* | (2011.01) |
| *H04N 21/475* | (2011.01) |

(52) U.S. Cl.
CPC ..... *H04N 21/4415* (2013.01); *G06K 9/00013* (2013.01); *G06K 9/00087* (2013.01); *G06K 9/00912* (2013.01); *G06K 9/00926* (2013.01); *H04N 5/4403* (2013.01); *H04N 21/4432* (2013.01); *H04N 21/4532* (2013.01); *H04N 21/4753* (2013.01); *H04N 2005/4428* (2013.01); *H04N 2005/4442* (2013.01); *H04N 2005/4444* (2013.01)

(58) Field of Classification Search
CPC .......... H04N 21/4415; G06K 9/00013; G06K 9/00087; G06K 9/00912
See application file for complete search history.

(56) References Cited

U.S. PATENT DOCUMENTS

| | | | |
|---|---|---|---|
| 2008/0128495 | A1 | 6/2008 | Weintraub et al. |
| 2009/0146779 | A1 | 6/2009 | Kumar et al. |
| 2009/0251619 | A1 | 10/2009 | Seidel et al. |
| 2010/0046918 | A1 | 2/2010 | Takao et al. |

(Continued)

FOREIGN PATENT DOCUMENTS

| | | |
|---|---|---|
| CN | 101964032 A | 2/2011 |
| EP | 1 286 518 A2 | 2/2003 |

OTHER PUBLICATIONS

Search Report issued to European counterpart application No. 18208487.1 by the EPO dated Jan. 23, 2019 (11 pages).

*Primary Examiner* — Sumaiya A Chowdhury
(74) *Attorney, Agent, or Firm* — Hamre, Schumann, Mueller & Larson, P.C.

(57) ABSTRACT

A method for controlling a television system including a television device and a controller device includes: detecting a fingerprint; analyzing the fingerprint to obtain an input fingerprint identification containing information regarding the fingerprint; identifying a pre-stored fingerprint identification matching the input fingerprint identification, and identifying a user-profile associated with the pre-stored fingerprint identification; and controlling operation of the television device based on the identified user-profile. The user-profile includes one or more of an age of the user, a channel list, a preset signal source, a preset video quality, and a preset audio quality.

11 Claims, 3 Drawing Sheets

(56) References Cited

U.S. PATENT DOCUMENTS

| | | | |
|---|---|---|---|
| 2015/0070516 A1* | 3/2015 | Shoemake | H04N 21/42203 |
| | | | 348/207.11 |
| 2016/0117542 A1* | 4/2016 | Klappert | G06K 9/00013 |
| | | | 725/25 |
| 2016/0373800 A1 | 12/2016 | Lin et al. | |
| 2017/0064390 A1* | 3/2017 | Kannan | H04N 21/25891 |

* cited by examiner

TELEVISION SYSTEM AND METHOD FOR CONTROLLING THE TELEVISION SYSTEM

CROSS-REFERENCE TO RELATED APPLICATION

This application claims priority of European Patent Application No. 18208487.1, filed on Nov. 27, 2018.

FIELD

The disclosure television relates to a system and a method for controlling the television system.

BACKGROUND

A television (TV) device is commonly shared among a group of people (e.g., family members). It is known that a viewing habit among members of the group of people may vary widely. It is also noted that for the elderly members or small children, operating a smart TV device having a number of functionalities outside of switching channels may be difficult.

SUMMARY

One object of the disclosure is to provide a method of controlling a television system, to enable the television system to switch among different user profiles corresponding respectively to members of a group of people, while having relatively simple control.

According to one embodiment of the disclosure, the method is for controlling a television system that includes a television device and a controller device. The television device includes a processor and a storage component storing a database therein. The database includes at least one pre-stored fingerprint identification and at least one user-profile associated with the at least one fingerprint identification. The controller device is capable of communicating with the television device, and includes a fingerprint sensor. The method includes:

by the fingerprint sensor, detecting a fingerprint;

upon determining that a fingerprint is detected by the fingerprint sensor, analyzing, by the controller device, the fingerprint to obtain an input fingerprint identification containing information regarding the fingerprint, and transmitting, by the controller device, the input fingerprint identification to the television device;

in response to receipt of the fingerprint identification, accessing, by the processor, the database stored in the storage component to identify a pre-stored fingerprint identification that matches the input fingerprint identification, and identifying, by the processor, a user-profile that is associated with the pre-stored fingerprint identification; and after a user-profile associated with the fingerprint identification and stored in the database is identified, controlling, by the processor, operation of the television device based on the identified user-profile.

The identified user-profile includes one or more of an age of the user, a channel list listing channels that are available to the user, a preset signal source, a preset video quality, and a preset audio quality.

Another object of the disclosure is to provide a television system that is capable of implementing the above-mentioned method.

According to one embodiment of the disclosure, the television system includes a television device and a controller device, the television device including a processor, a display, and a storage component storing a database therein. The database includes at least one user-profile. The controller device includes a communication component for communicating with the television device and a fingerprint sensor.

The fingerprint sensor is configured to detect a fingerprint.

The controller device is configured to, upon determining that a fingerprint is detected by the fingerprint sensor, analyze the fingerprint to obtain an input fingerprint identification containing information regarding the fingerprint, and to transmit the input fingerprint identification to the television device.

The processor is configured to, in response to receipt of the fingerprint identification, access the database stored in the storage component to identify a pre-stored fingerprint identification that matches the input fingerprint identification, and to identify a user-profile that is associated with the pre-stored fingerprint identification.

The processor is configured to, after a user-profile associated with the fingerprint identification and stored in the database is identified, control operation of the television device based on the identified user-profile.

The identified user-profile includes one or more of an age of the user, a channel list listing channels that are available to the user, a preset signal source, a preset video quality, and a preset audio quality.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
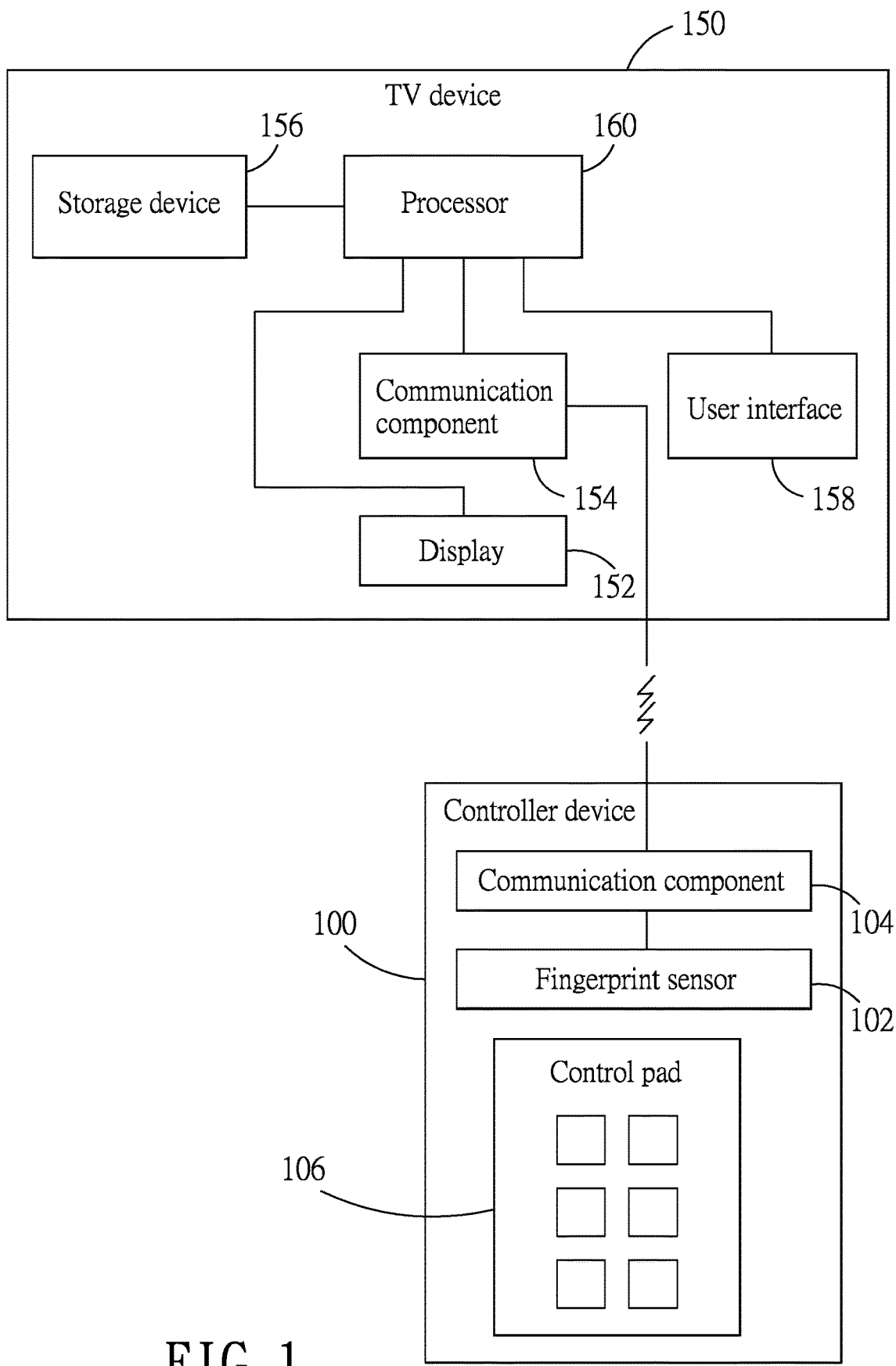
FIG. 1 is a block diagram of a television system according to one embodiment of the disclosure.

FIG. 1 is a block diagram illustrating a television system that includes a television (TV) device 150 and a controller device 100 according to one embodiment of the disclosure.

The TV device 150 includes a display 152, a communication component 154, a storage device 156, a user interface 158, and a processor 160.

The processor 160 is capable of executing one or more software applications including instructions that, when executed, cause the processor 160 to perform certain operations. The processor 160 may refer to any device or portion of a device that processes electronic data from registers and/or memory to transform that electronic data into other electronic data. For example, the processor 160 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication component 154 is capable of communicating with the controller device 100 using a short distance wireless communication technology. The communication component 154 may be further capable of communicating with various parties over a network (e.g., the Internet) using wired or wireless communication for data transmission. The communicating component 154 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The storage device 156 in this embodiment may include any non-transitory memory mechanism, such as read-only memory (ROM), random-access memory (RAM), magnetic disk storage media, optical storage media, flash memory, solid state devices (SSD), and other storage devices and media. The storage device 156 stores at least one software application installed in the TV device 150. The software application may be an operating system (OS) or other applications providing the TV device 150 with various functionalities. For example, the software application may be an online media playing application such as YouTube®, NETFLIX®, Google Play Movie®, etc. Additionally, the storage device 156 may store the software applications and a database therein. The database includes at least one user-profile that corresponds with one member of a group of people (e.g., a family).

The controller device 100 may be embodied using a remote control, and includes a control pad 106, a communication component 104 for communicating with the television device 150 and a fingerprint sensor 102.

It is noted that the communication component 104 may include elements similar to that of the communication component 154, so as to transmit information wirelessly to the communication component 154. Additionally, the fingerprint sensor 102 may be embodied using a sensor that is known in the art, and details thereof is omitted therein for the sake of brevity.

Upon powering on the TV device 150, the processor 160 may require a user to complete a registration operation (e.g., to display a screen having a "sign-up" button to register as a registered user), or an authentication operation (e.g., to display a screen having a "login" button to gain access as a registered user) using the controller device 100.

When the user selects the sign-up button, the controller device 100 transmits a request for creating a user-profile to the TV device 150. In response, the processor 160 initiates a user-profile setting procedure.

In the user-profile setting procedure, the processor 160 creates a new user-profile associated with the user. Afterward, the processor 160 controls the display 152 to display a direction message for instructing the user to put one finger on the fingerprint sensor 102 of the controller device 100.

The fingerprint sensor 102 is then activated to detect the fingerprint of the user. When a fingerprint is detected, the fingerprint of the user is analyzed to obtain a new fingerprint identification. In this embodiment, the controller device 100 performs the analysis to obtain the new fingerprint identification, and transmits the new fingerprint identification to the TV device 150. In other embodiments, the controller device 100 transmits the fingerprint of the user to the TV device 150, and the processor 160 performs the analysis to obtain the new fingerprint identification.

In response to the new fingerprint identification, the TV device 150 associates the new fingerprint identification with the new user-profile and stores the new user-profile and the new fingerprint identification in the database.

In the user-profile setting procedure, the user may input user information that constitutes a user-profile. In this embodiment, the user information includes one or more of a username of the user, an age of the user, a channel list that lists channels that are available to the user (e.g., the list may exclude programs that maybe inappropriate for the user, such as age-restricted program), a preset password, a preset signal source (e.g., cable TV, a source from a high definition multimedia interface (HDMI), one of the online media playing applications installed, etc.), one or more preset broadcasting volumes (e.g., when at night, a lower preset broadcasting volume may be applied), a preset video quality, and a preset audio quality.

In some embodiments, the user information may further include booting information that constitutes a start-up screen. The booting information includes one or more of a background wallpaper, a displaying theme, an audio file to be played, and a screen saver.

In response to receipt of the user-input user information, the processor 160 also associates the user-input user information with the new user-profile.

When the user selects the login button, the controller device 100 transmits a request for login to the TV device 150. In response, the processor 160 initiates a login procedure and controls the display 152 to display a login screen instructing the user to input login information.

In this embodiment, the login information may be inputted using one of a number of ways. For example, the user may input a username-password combination using the controller device 100. Alternatively, the fingerprint sensor 102 may be activated, and the user may place his/her finger on the fingerprint sensor 102.

When it is determined that the fingerprint of the user is detected, the controller device 100 analyzes the fingerprint to obtain an input fingerprint identification containing information regarding the fingerprint, and transmits the input fingerprint identification to the television device 150.

In response to receipt of the fingerprint identification, the processor 160 accesses the database stored in the storage component 156 to identify a pre-stored fingerprint identification that matches the input fingerprint identification, and identifies a user-profile that is associated with the pre-stored fingerprint identification.

After a user-profile associated with the fingerprint identification and stored in the database is identified, the processor 160 controls operation of the television device 150 based on the identified user-profile.

Figure 2:
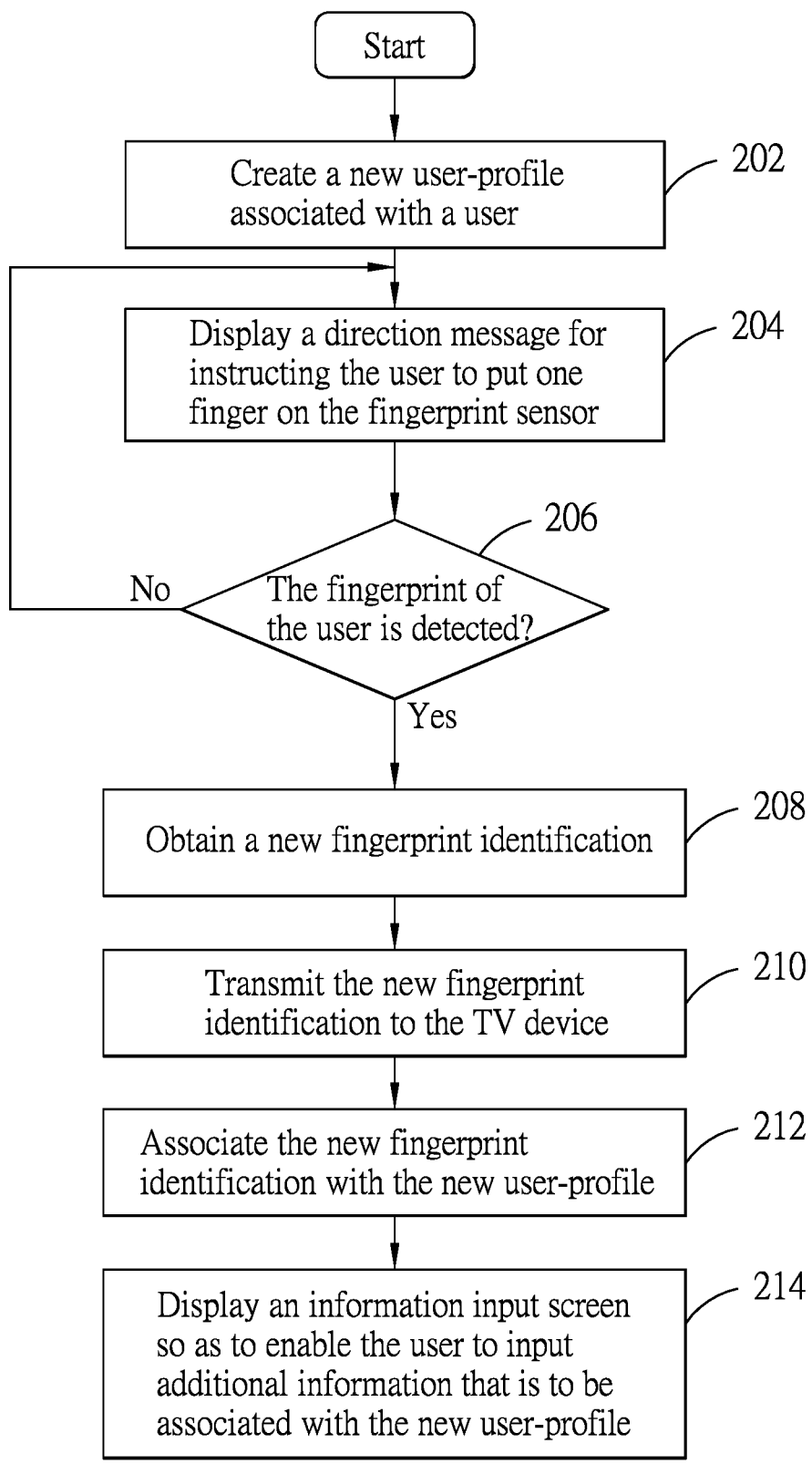
FIG. 2 is a flow chart illustrating steps of a user-profile setting procedure according to one embodiment of the disclosure.

FIG. 2 is a flow chart illustrating steps of a user-profile setting procedure according to one embodiment of the disclosure. In this embodiment, the method is implemented using the TV system as shown in the embodiment of FIG. 1.

In step 202, in response to a request for creating a user-profile, the processor 160 creates a new user-profile associated with a user. Specifically, the request may be inputted by the user operating the controller device 100, and transmitted to the TV device 150.

In step 204, the processor 160 controls the display 152 to display a direction message for instructing the user to put one finger on the fingerprint sensor 102.

In step 206, the fingerprint sensor 102 is activated to detect a fingerprint of the user. It is noted herein that the fingerprint sensor 102 may remain activated at all times in one embodiment. When the fingerprint of the user is detected, the flow proceeds to step 208. On the other hand, when the fingerprint of the user is not detected after a predetermined time (e.g., 30 seconds), the flow may return to step 204, or alternatively, the procedure may be terminated.

In step 208, the controller device 100 analyzes the fingerprint of the user to obtain a new fingerprint identification. It is noted that, when the fingerprint of the user detected in step 206 is unrecognizable, the flow may return to step 204 instructing the user to put one finger on the fingerprint sensor 102 again.

In step 210, the controller device 100 transmits the new fingerprint identification to the TV device 150.

In step 212, the processor 160 associates the new fingerprint identification with the new user-profile, and stores the new user-profile and the new fingerprint identification in the database of the storage component 156.

Afterward, in step 214, the processor 160 controls the display 152 to display an information input screen so as to enable the user to input additional information that is to be associated with the new user-profile (e.g., the booting information as described above). The information that is inputted in this step is then associated with the new user-profile and stored in the database.

Figure 3:
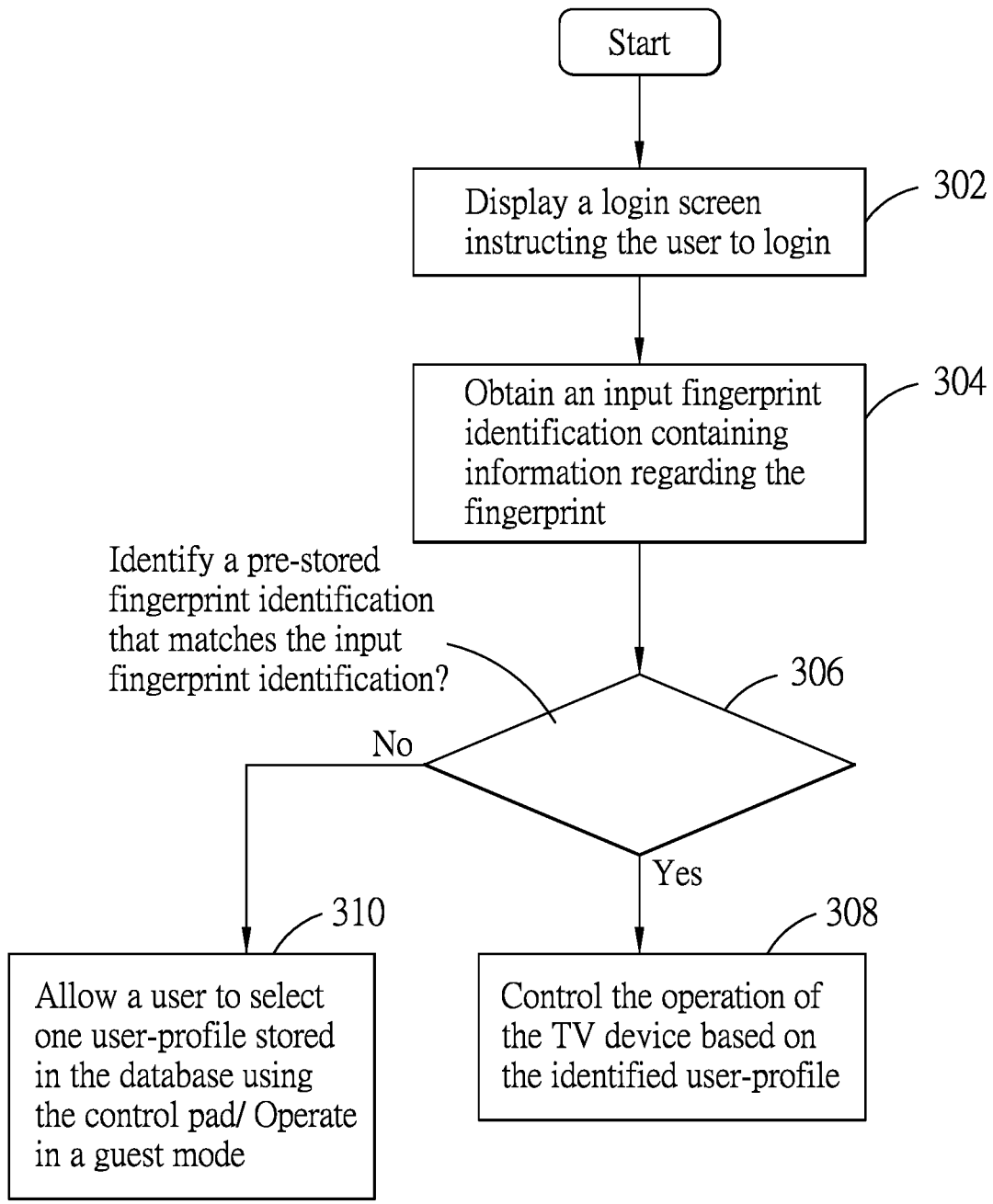
FIG. 3 is a flow chart illustrating steps of a method for controlling a television system according to one embodiment of the disclosure.

FIG. 3 is a flow chart illustrating steps of a method for controlling a television system according to one embodiment of the disclosure. In this embodiment, the method is implemented using the TV system as shown in the embodiment of FIG. 1.

In step 302, in response to a power-up signal from the controller device 100, the processor 160 controls the display 152 to display a login screen instructing the user operating the controller device 100 to login. It is noted that in some embodiments, the login screen may be displayed simultaneously with a television screen from a television signal. That is to say, the user may start watching television while logging in.

To log in, the user may place one finger on the fingerprint sensor 102. Alternatively, the user may operate the controller device 100 to input the username-password combination.

In step 304, upon determining that a fingerprint is detected by the fingerprint sensor 102, the controller device 100 analyzes the fingerprint to obtain an input fingerprint identification containing information regarding the fingerprint, and transmits the input fingerprint identification to the TV device 150.

In response to receipt of the fingerprint identification, in step 306, the processor 160 of the TV device 150 accesses the database stored in the storage component 156 to identify a pre-stored fingerprint identification that matches the input fingerprint identification, and identifies a user-profile that is associated with the pre-stored fingerprint identification.

When a user-profile associated with the fingerprint identification and stored in the database is identified, the flow proceeds to step 308. Otherwise, the flow proceeds to step 310.

In step 308, the processor 160 controls the operation of the TV device 150 based on the identified user-profile.

For example, the processor 160 may execute a preset online media-playing application to serve as the preset signal source and control the display 152 of the TV device 150 to display media stream received from the online media-playing application. Additionally, the processor 160 may control the TV device 150 to change to the preset broadcasting volume, change the video quality and/or the audio quality, and display the start-up screen, etc.

It is noted that as the user is viewing the TV device 150 while logged in as one of the user-profiles, a viewing history may be recorded and associated with the one of the user-profiles. The processor 160 may perform an analysis on the viewing history so as to obtain a viewing preference of the user, which may be incorporated into the user-profiles.

In the case that the age of the user is included in the user-profile, when the TV device is in operation, the processor 160 may determine whether the identified user-profile directs operation of the TV device 150 to display an age-restricted program having a specific age floor (e.g., 18 years old).

When it is determined that the identified user-profile directs operation of the TV device 150 to display the age-restricted program, the processor 160 compares the age of the user and the age floor of the age-restricted program. When it is determined that age of the user is smaller than the age floor of the age-restricted programs, the processor 160 controls the display 152 to display an alternative screen to prevent the age-restricted program from being displayed.

In one example, the alternative screen includes an input field for inputting a preset password, and the processor 160 is programmed to, when determining that the inputted password is correct, control the TV device 150 to display the age-restricted program.

When it is determined that no pre-stored fingerprint identification that matches the input fingerprint identification is identified, in step 310, the processor 160 controls the display 152 of the TV device 150 to display a manual selection screen allowing a user to select one of the at least one user-profile stored in the database using the control pad 106 of the controller device 100.

Alternatively, in step 310, the processor 160 automatically controls the TV device 150 to operate in a guest mode.

To sum up, the embodiments of the disclosure provide a TV system and a method for controlling the TV system. In using the TV system, a user who has already set up a user-profile may log in by placing a finger on the fingerprint sensor 102 instead of using the control pad 106 to enter the username-password combination. This configuration enables each member of the group to easily log in to operate the TV system with his/her own user-profile. This may be particularly beneficial for the elderly members and the children, who may not be adept at operating the TV system.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for controlling a television system that includes a television device and a controller device, the television device including a processor and a storage component storing a database therein, the database including at least one pre-stored fingerprint identification and at least one user-profile associated with the at least one fingerprint identification, the controller device being capable of communicating with the television device and including a fingerprint sensor, the method comprising steps of:

by the fingerprint sensor, detecting a fingerprint;

upon determining that a fingerprint is detected by the fingerprint sensor, analyzing, by the controller device, the fingerprint to obtain an input fingerprint identification containing information regarding the fingerprint, and transmitting, by the controller device, the input fingerprint identification to the television device;

in response to receipt of the fingerprint identification, accessing, by the processor, the database stored in the storage component to identify a pre-stored fingerprint identification that matches the input fingerprint identification, and identifying, by the processor, a user-profile that is associated with the pre-stored fingerprint identification;

after a user-profile associated with the fingerprint identification and stored in the database is identified, controlling, by the processor, operation of the television device based on the identified user-profile; and when it is determined that no pre-stored fingerprint identification that matches the input fingerprint identification is identified, controlling, by the processor, a display of the television device to display a manual selection screen allowing a user to select one of the at least one user-profile stored in the database using a control pad of the controller device, wherein the identified user-profile includes one or more of an age of the user, a channel list listing channels that are available to the user, a preset signal source, a preset video quality, and a preset audio quality, wherein the identified user-profile further includes booting information that constitutes a start-up screen, the booting information including one or more of a background wallpaper, a displaying theme, an audio file to be played, and a screen saver, and wherein in the step of controlling operation of the television device, the processor accesses the booting information in the identified user-profile, and controls the display to display the start-up screen based on the booting information.

2. The method of claim 1, further comprising a step of, when it is determined that no pre-stored fingerprint identification that matches the input fingerprint identification is identified, automatically controlling, by the processor, the television device to operate in a guest mode.

3. The method of claim 1, further comprising, in response to a request for creating a user-profile, a user-profile setting procedure that includes:

creating a new user-profile associated with a user;

displaying a direction message for instructing the user to put one finger on the fingerprint sensor;

detecting a fingerprint of the user;

analyzing the fingerprint of the user to obtain a new fingerprint identification; and associating the new fingerprint identification with the new user-profile and storing the new user-profile and the new fingerprint identification in the database.

4. The method of claim 1, wherein the step of controlling operation of the television device includes:

determining whether the identified user-profile directs operation of the television device to display an age-restricted program having a specific age floor;

when it is determined that the identified user-profile directs operation of the television device to display the age-restricted program, comparing the age of the user and the age floor of the age-restricted program; and when it is determined that age of the user is smaller than the age floor of the age-restricted programs, displaying an alternative screen to prevent the age-restricted program from being displayed.

5. The method of claim 4, wherein the alternative screen includes an input field for inputting a preset password, and the step of controlling operation of the television device further includes: controlling the television device to display the age-restricted program when determining that the inputted password is correct.

6. The method of claim 1, wherein:

the preset signal source is an online media-playing application; and in the step of controlling operation of the television device, the processor executes the online media-playing application and controls a display of the television device to display media stream received from the online media-playing application.

7. A television system including a television device and a controller device, the television device including a processor, a display, and a storage component storing a database therein, the database including at least one user-profile, said controller device including a communication component for communicating with said television device and a fingerprint sensor, said controller device further including a control pad, wherein:

said fingerprint sensor is configured to detect a fingerprint;

said controller device is configured to, upon determining that a fingerprint is detected by said fingerprint sensor, analyze the fingerprint to obtain an input fingerprint identification containing information regarding the fingerprint, and to transmit the input fingerprint identification to the television device;

said processor is configured to, in response to receipt of the fingerprint identification, access the database stored in said storage component to identify a pre-stored fingerprint identification that matches the input fingerprint identification, and to identify a user-profile that is associated with the pre-stored fingerprint identification;

said processor is configured to, after a user-profile associated with the fingerprint identification and stored in the database is identified, control operation of said television device based on the identified user-profile; and said processor is configured to, when it is determined that no pre-stored fingerprint identification that matches the input fingerprint identification is identified, control said display of said television device to display a manual selection screen allowing a user to select one of the at least one user-profile stored in the database using said control pad of said controller device, wherein the identified user-profile includes one or more of an age of the user, a channel list listing channels that are available to the user, a preset signal source, a preset video quality, and a preset audio quality, wherein the identified user-profile further includes booting information that constitutes a start-up screen, the booting information including one or more of a background wallpaper, a displaying theme, an audio file to be played, and a screen saver, and wherein in controlling operation of said television device, said processor accesses the booting information in the identified user-profile, and controls said display to display the start-up screen based on the booting information.

8. The television system of claim 7, wherein:

when it is determined that no pre-stored fingerprint identification that matches the input fingerprint identification is identified, said processor is configured to automatically control said television device to operate in a guest mode.

9. The television system of claim 7, wherein said processor is configured to, in response to a request for creating a user-profile, execute a user-profile setting procedure that includes:

creating a new user-profile associated with a user;

displaying a direction message for instructing the user to put one finger on said fingerprint sensor of said controller device;

receiving a new fingerprint identification from said controller device; and associating the new fingerprint identification with the new user-profile and storing the new user-profile and the new fingerprint identification in the database.

10. The television system of claim 7, wherein in controlling operation of said television device, said processor is further configured to:

determine whether the identified user-profile directs operation of said television device to display an age-restricted program having a specific age floor;

when it is determined that the identified user-profile directs operation of said television device to display the age-restricted program, compare the age of the user and the age floor of the age-restricted program; and when it is determined that the age of the user is smaller than the age floor of the age-restricted programs, display an alternative screen to prevent the age-restricted program from being displayed.

11. The television system of claim 7, said television device further including a display, wherein:

the preset signal source is an online media-playing application; and in controlling operation of said television device, said processor is configure to execute the online media-playing application and control said display of said television device to display media stream received from the online media-playing application.

* * * * *